(12) United States Patent
Zhang (10) Patent No.: US 10,979,930 B1
(45) Date of Patent: Apr. 13, 2021

(54) VEHICLE COMMUNICATIONS CONTROL

(71) Applicant: Ford Global Technologies, LLC, Dearborn, MI (US)

(72) Inventor: Linjun Zhang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/822,501

(22) Filed: Mar. 18, 2020

(51) Int. Cl.
| | |
|---|---|
| *H04W 28/02* | (2009.01) |
| *H04W 4/40* | (2018.01) |
| *H04W 72/04* | (2009.01) |
| *H04L 12/801* | (2013.01) |
| *H04W 72/00* | (2009.01) |

(52) U.S. Cl.
CPC ......... *H04W 28/0231* (2013.01); *H04L 47/14* (2013.01); *H04L 47/15* (2013.01); *H04W 4/40* (2018.02); *H04W 72/005* (2013.01); *H04W 72/0486* (2013.01)

(58) Field of Classification Search
None
See application file for complete search history.

(56) References Cited

U.S. PATENT DOCUMENTS

| | | | |
|---|---|---|---|
| 6,741,926 B1 | 5/2004 | Zhao et al. | |
| 8,907,814 B2 | 12/2014 | Chen | |
| 9,633,560 B1 | 4/2017 | Gao et al. | |
| 9,852,637 B2 | 12/2017 | Hayee et al. | |
| 10,231,187 B1 | 3/2019 | Rubin et al. | |
| 10,237,866 B2 | 3/2019 | Hwang et al. | |
| 10,466,716 B1 | 11/2019 | Su et al. | |
| 2013/0154853 A1 | 6/2013 | Chen | |
| 2016/0133130 A1 | 5/2016 | Grimm et al. | |
| 2018/0158329 A1 | 6/2018 | Benhammou et al. | |
| 2018/0365909 A1 | 12/2018 | Cheng et al. | |

(Continued)

FOREIGN PATENT DOCUMENTS

| | | |
|---|---|---|
| WO | 2017052488 A1 | 3/2017 |
| WO | 2017191615 A1 | 11/2017 |

(Continued)

OTHER PUBLICATIONS

Non-Final Office Action dated Oct. 29, 2020, U.S. Appl. No. 16/362,950, filed Mar. 25, 2019.

(Continued)

*Primary Examiner* — Anh Ngoc M Nguyen
(74) *Attorney, Agent, or Firm* — Frank A. MacKenzie; Bejin Bieneman PLC (57) ABSTRACT

A system comprises a computer and a memory. The memory stores instructions to determine that a vehicle communication channel busy ratio exceeds a threshold, and then, based upon determining that the channel busy ratio exceeds the threshold, to classify a traffic condition for a road segment within a coverage area of an infrastructure element based on at least one of a traffic density and a status of a traffic light. The memory further includes instructions to determine a broadcast policy for the road segment based on the channel busy ratio exceeding the threshold and the classified traffic condition, wherein the broadcast policy is selected from a set of policies that includes (1) a periodic broadcast of messages and (2) a broadcast limited to specified messages.

20 Claims, 4 Drawing Sheets

(56) References Cited

U.S. PATENT DOCUMENTS

| | | |
|---|---|---|
| 2019/0104525 A1 | 4/2019 | Santhanam et al. |
| 2019/0132709 A1 | 5/2019 | Graefe et al. |
| 2019/0294966 A1 | 9/2019 | Khan et al. |
| 2020/0180602 A1* | 6/2020 | Jeong .................... B60W 10/06 |
| 2020/0211374 A1* | 7/2020 | Liu ...................... G08G 1/0145 |

FOREIGN PATENT DOCUMENTS

| | | |
|---|---|---|
| WO | 2018145067 A1 | 8/2018 |
| WO | 2018187632 A1 | 10/2018 |
| WO | 2019137622 A1 | 7/2019 |

OTHER PUBLICATIONS

Verma et al., "An Analytical Review of the Algorithms Controlling Congestion in Vehicular Networks", IOSR Journal of Computer Engineering (IOSR-JCE), e-ISSN: 2278-0661,p-ISSN: 2278-8727, vol. 17, Issue 3, Ver. IV (May-Jun. 2015), pp. 32-41 www.iosrjournals.org.

* cited by examiner

VEHICLE COMMUNICATIONS CONTROL

BACKGROUND

A vehicle can transmit messages, e.g., including data about an environment or area around the vehicle, to one or more other vehicles, infrastructure elements, etc., via one or more wireless communication networks and/or protocols, e.g., providing what can be referred to as vehicle-to-everything (V2X) communications. Data shared via V2X communications from a host vehicle can include data about a speed of a host vehicle or a detected speed or speeds of other vehicles, a lane change, speed change, a hard brake, a vehicle malfunction, etc., planned, executed, and/or experienced by the host vehicle, etc. However, V2X communication networks, i.e., available bandwidth for radio frequency (RF) communications, may become congested or diminished due to a number of vehicles broadcasting data and/or an amount of information each vehicle broadcasts. Such congestion can prevent a vehicle from transmitting important information to other vehicles and/or infrastructure, and/or cause packet errors.

DETAILED DESCRIPTION

Introduction

Disclosed herein is a system, comprising a computer and a memory. The memory stores instructions to determine that a vehicle communication channel busy ratio exceeds a threshold, then, based upon determining that the channel busy ratio exceeds the threshold, to classify a traffic condition for a road segment within a coverage area of an infrastructure element based on at least one of a traffic density and a status of a traffic light, and to determine a broadcast policy for the road segment based on the channel busy ratio exceeding the threshold and the classified traffic condition, wherein the broadcast policy is selected from a set of policies that includes (1) a periodic broadcast of messages and (2) a broadcast limited to specified messages.

The broadcast policy specifies a cycle time for the periodic broadcast.

The specified messages report at least one of a deceleration exceeding a threshold, a vehicle malfunction, or an irregular vehicle motion including one of a slipping, a roll over, or a lateral drift.

The instructions may further include instructions to receive data from a plurality of vehicles, to identify one or more vehicles from the plurality of vehicles on the road segment based on location data included in the received data, and to determine the traffic density for the road segment based on the identified one or more vehicles.

The instructions may further include instructions to determine the status of the traffic light based on data received from a remote computer, and to classify the traffic condition of the road segment based on whether a traffic in the road segment is stopped at a red light based on the determined status of the traffic light.

The instructions may further include instructions to receive, in a vehicle, the determined broadcast policy, to determine a location of the vehicle based on vehicle sensor data; and upon determining that the vehicle is within the road segment, to broadcast vehicle data based on the determined broadcast policy.

The instructions may further include instructions to, upon receiving, in a vehicle, the broadcast policy including broadcast of only specified messages, limit vehicle outbound messages to the specified messages.

The instructions may further include instructions to, upon receiving, in a vehicle, the broadcast policy including to periodically broadcast data, broadcast, from the vehicle, data based on vehicle sensor data and a specified cycle time for broadcasting data.

The classified traffic condition may be one of a normal speed with no traffic light, traffic congestion with no traffic light, stopped at red light, normal speed at green traffic light, and traffic congestion at a green light.

The instructions may further include instructions to select the periodic broadcast upon determining one of the normal speed with no traffic light and normal speed at a green light, and to select the broadcast of only specified messages upon determining one of the traffic congestion with no traffic light, stopped at red light, and a traffic congestion at green light.

Further disclosed herein is a method, comprising determining that a vehicle communication channel busy ratio exceeds a threshold, then, based upon determining that the channel busy ratio exceeds the threshold, classifying a traffic condition for a road segment within a coverage area of an infrastructure element based on at least one of a traffic density and a status of a traffic light; and determining a broadcast policy for the road segment based on the channel busy ratio exceeding the threshold and the classified traffic condition, wherein the broadcast policy is selected from a set of policies that includes (1) a periodic broadcast of messages and (2) a broadcast limited to specified messages.

The broadcast policy may specify a cycle time for the periodic broadcast.

The specified messages may report at least one of a deceleration exceeding a threshold, a vehicle malfunction, or an irregular vehicle motion including one of a slipping, a roll over, or a lateral drift.

The method may further include receiving data from a plurality of vehicles, identifying one or more vehicles from the plurality of vehicles on the road segment based on location data included in the received data, and determining the traffic density for the road segment based on the identified one or more vehicles.

The method may further include determining the status of the traffic light based on data received from a remote computer; and classifying the traffic condition of the road segment based on whether a traffic in the road segment is stopped at a red light based on the determined status of the traffic light.

The method may further include receiving, in a vehicle, the determined broadcast policy; determining a location of the vehicle based on vehicle sensor data; and upon determining that the vehicle is within the road segment, broadcasting vehicle data based on the determined broadcast policy.

The method may further include, upon receiving, in a vehicle, the broadcast policy including broadcast of only specified messages, limiting vehicle outbound messages to the specified messages.

The method may further include, upon receiving, in a vehicle, the broadcast policy including to periodically broadcast data, broadcasting, from the vehicle, data based on vehicle sensor data and a specified cycle time for broadcasting data.

The classified traffic condition may be one of a normal speed with no traffic light, traffic congestion with no traffic light, stopped at red light, normal speed at green traffic light, and traffic congestion at a green light.

The method may further include selecting the periodic broadcast upon determining one of the normal speed with no traffic light and normal speed at a green light; and selecting the broadcast of only specified messages upon determining one of the traffic congestion with no traffic light, stopped at red light, and a traffic congestion at the green light.

Further disclosed is a computing device programmed to execute any of the above method steps.

Yet further disclosed is a computer program product, comprising a computer readable medium storing instructions executable by a computer processor, to execute any of the above method steps.

Exemplary System Elements

Various vehicle can send and/or receive messages via wireless communication networks and/or protocols, e.g., vehicle-to-everything (V2X) communications. However, a wireless network may become congested when multiple vehicles within a limited area, e.g., an area with a radius of 1000 meters (m) or less, transmit information via a communication channel of the wireless network. In the present context, channel "congestion" means that the channel's bandwidth is utilized at or beyond a threshold at which it has been determined that data transfer is impaired. For example, this threshold has been determined to be 70% channel utilization in one experiment. For example, a communication channel bandwidth may be 6 Megabit/second (Mb/s). Then if 250 vehicles within an area each send a message with a size of 2400 bits and a transmission rate of 10 Hz, then the messages utilize an entirety (i.e., 100%) of bandwidth of the communication channel, because 2400 bits*10 Hz*250=6 Mb/s. The channel in this example is thus said to be congested.

Congestion of a wireless communication channel can be detected, and prevented or ameliorated, by controlling messages broadcast by one or more vehicles. An exemplary system includes a computer, e.g., of an infrastructure element, that can be programmed, upon determining that a vehicle communication channel busy ratio exceeds a threshold, determine a traffic classification for a road segment within a coverage area of an infrastructure element based on at least one of a traffic density and a status of a traffic light. The computer can be further programmed to determine a broadcast policy for the road segment based on the traffic classification. The broadcast policy may be selected from a set of policies that includes a periodic broadcast of messages or a broadcast of only specified messages.

Figure 1:
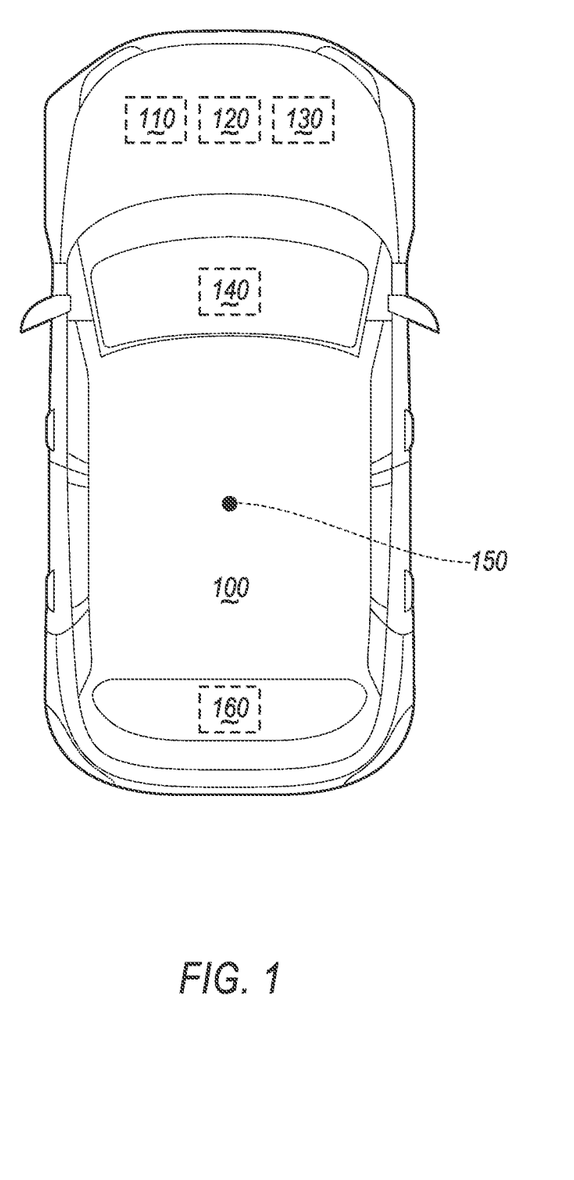
FIG. 1 is a diagram illustrating an example vehicle.

FIG. 1 illustrates a vehicle 100 which may be powered in a variety of ways, e.g., with an electric motor and/or internal combustion engine. The vehicle 100 may be a land vehicle such as a car, truck, etc. Additionally or alternatively, a vehicle 100 may be a drone, a robot, etc. Additionally or alternatively, the vehicle 100 may include a bicycle, a motorcycle, etc. A vehicle 100 may include a computer 110, actuator(s) 120, sensor(s) 130, and a Human Machine Interface (HMI 140), and a wireless communication interface 160. A reference point such as a geometrical center point 150 can be specified for a vehicle 100, e.g., a point at which respective longitudinal and lateral centerlines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Additionally or alternatively, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of a vehicle 100.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, second vehicles 100, etc., relative to the location of the vehicle 100. The sensors 130 may further alternatively or additionally include camera sensor(s) 130, e.g. front view, side view, etc., providing images from an area surrounding the vehicle 100.

The vehicle 100 may determine a location, e.g., GPS location coordinates, of the vehicle 100 relative to a coordinate system 270, e.g., based on data received from a vehicle 100 GPS (Global Positioning System) sensor 130. Additionally, the computer 110 may be programmed to determine a direction of the vehicle 100 movement, e.g., based on data received from the GPS sensor 130.

The HMI 140 may be configured to receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input.

The computer 110 may be programmed to receive a destination, e.g., location coordinates, via the HMI 140, and to determine a route from a current location of the vehicle 100 to the received destination. The computer 110 may be programmed to operate the vehicle 100 in an autonomous mode from the current location to the received destination based on the determined route.

The computer 110 may be configured for communicating through a wireless communication interface 160 with other vehicles 100, e.g., via a vehicle-to-vehicle (V2V), a vehicle-to-infrastructure (V-to-I) communication, and/or a vehicle-to-everything (V2X) communication network (i.e., communications that can include V2V and V2I). The communication interface 160 may include elements for sending (i.e., transmitting) and receiving radio frequency (RF) communications, e.g., chips, antenna(s), transceiver(s), etc. The V2X communication represents one or more mechanisms by which vehicle 100 computers 110 may communicate with other vehicles 100 and/or infrastructure element(s) 210 (see FIG. 2), and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier. For example, channel 172 is typically used for basic safety messages (BSM) in a V2X network.

Figure 2:
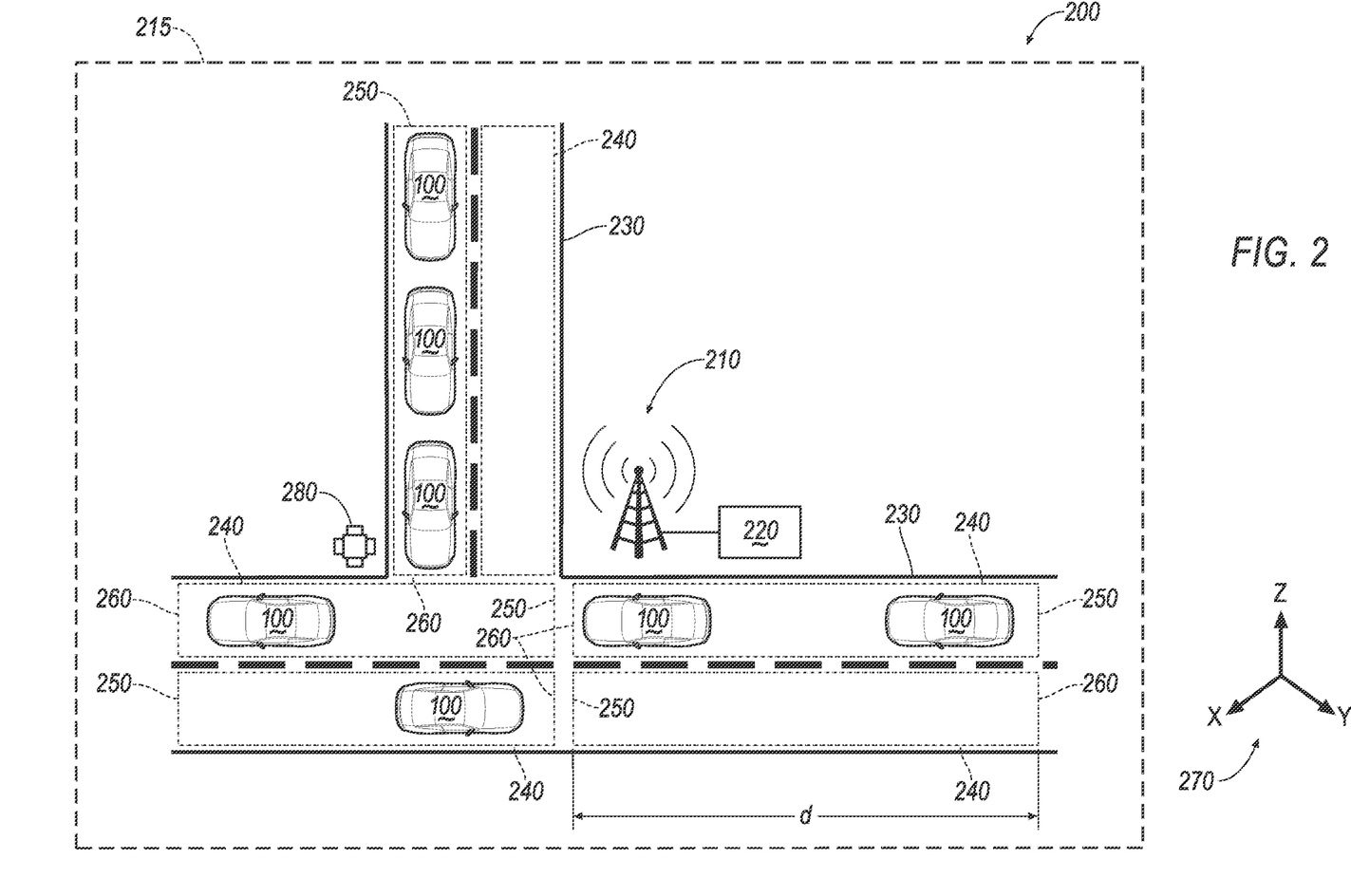
FIG. 2 is a diagram showing an infrastructure element and vehicles within a coverage area of the infrastructure element.

In the present context, a message sent by a vehicle 100 computer 110 via a V2X communication network or protocol is an outbound message, whereas a message received at a vehicle 100 computer 110, via V2X communications is an inbound message. In the present context, the term "transmit" and the term "broadcast" are used interchangeably to refer to outbound messages. In other words, any computer communicating within a V2X communication network may receive a message sent by the vehicle 100 computer 110. In some examples, the vehicle 100 computer 110 may include intended receiver identifier(s), e.g., an infrastructure element 210 identifier, an identifier of a second vehicle 100, etc., in the transmitted message. Thus, a computer in the V2X communication network other than the specified receiver may ignore the received message.

A channel busy ratio (CBR) of a channel is a ratio, defined as a proportion of channel time where the energy measured on the channel is above a specified clear channel assessment (CCA) threshold. For example, a CBR can be measured by determining an amount of time, in the specified period of time, that a strength of a channel signal exceeds a threshold. A channel busy ratio may be specified in a percentage, e.g., in a range of 0% (zero percent) which means the channel is not utilized, to 100%, which means the channel is fully utilized. Alternatively, a channel busy ratio may be specified in other ways, e.g., on a numeric scale such as from zero to one, where zero means no utilization and one means full utilization. A channel busy ratio can be specified for each channel of a plurality of available channels in a V2X communication network. Thus, different channels of a V2X communication network may have different channel busy ratio values. A computer such as an infrastructure element 210 computer 220 may be programmed to determine respective channel busy ratios of one or more channels of a V2X communication network. The computer 220 may include chips and/or other dedicated electronic components such as an ASIC (Application Specific Integrated Circuit) configured to measure a channel busy ratio of one or more communication channels.

In practice, a communication channel is considered to be congested if channel busy ratio of the respective CBR exceeds a channel busy ratio congestion threshold, thus, a vehicle 100 computer 110 may be unable of transmitting outbound messages or outbound messages may not be correctly received by vehicles 100 due to the packet collisions over the air. Typically, a channel busy ratio of less than a first threshold 50% implies that the respective V2X communication channel is available (i.e., not busy). When a channel busy ratio exceeds a second threshold 70%, the channel may be considered to be congested i.e., regulating the communication in order to prevent a congestion of the channel may be needed. When a channel busy ratio is between the first threshold, e.g., 50%, and the second threshold, e.g., 70%, or simply when it is below the second threshold, then the channel may be considered as within normal operation, i.e., busy but with no need to start regulating the communication. Regulation, as discussed below, means defining policies with respect to what a vehicle 100 computer 110 should or should not transmit via the respective channel. In one example, the computer 220 may be programmed to broadcast a segmentation table only upon detecting a channel congestion. In other words, if there is no channel congestion, the infrastructure element 210 may not broadcast a segmentation table to save bandwidth. In one example, if a vehicle 100 computer 110 does not receive a segmentation table, the computer 110 may be programmed to broadcast messages at the specified frequency, e.g., 10 Hz.

A vehicle 100 computer 110 may broadcast messages based on a V2X communication protocol, e.g., DSRC, to other vehicles 100. The computer 110 may be programmed to receive data from vehicle 100 sensors 130, other computers 110, controllers, etc., to generate a V2X message, and to broadcast the V2X message via the communication interface 160. The computer 110 may be programmed to send outbound messages via the wireless interface 160 to other computers such as computers in other vehicles 100, infrastructure element 210, etc.

The vehicle 100 computer 110 may be programmed to transmit outbound messages based on a broadcast policy P, as discussed further below with respect to FIG. 2. A broadcast policy P includes information specifying what type of data and how often may be transmitted by a vehicle 100 computer 110 via the V2X communication network. A broadcast policy P may specify that a vehicle 100 computer 110 may transmit periodically any type of data, whereas another broadcast policy P may limit sending messages to only specified event-triggered messages.

Typically, a specified event-triggered massage reports information related to a safety of the vehicle 100 and/or other objects such as other vehicles 100, pedestrians, etc., such as a message reporting a severe deceleration, e.g., greater than two meters per second squared (2 m/s²). An event in the present context is a datum or data matching a specified value and/or exceeding (or falling below) a specified threshold. An event-triggered message is a message that is triggered to be sent upon occurrence of an event, e.g., detection of severe vehicle 100 deceleration (i.e., deceleration above a specified threshold), where a periodic message including the possible event, i.e., specifying a deceleration value, is sent based on a cycle time, e.g., every 500 milliseconds (ms). In another example, an event-triggered message may report a vehicle fault, e.g., based on a diagnostic trouble code (DTC) or the like received via a vehicle network such as a CAN bus and stored in a vehicle 100 computer 110 identifying a fault of a vehicle 100 brake, steering, powertrain, etc. In another example, an event-triggered message may report an irregular vehicle 100 motion such as a slipping, a roll over, and a lateral drift that may be determined based on data received from a vehicle 100 sensor 130, e.g., an acceleration sensor 130, yaw sensor 130, etc.

Table 1 shows an example set of broadcast policies for a vehicle 100 computer 110.

TABLE 1

| Identifier | Name of Policy P | Policy description |
|---|---|---|
| P₁ | Periodically transmit at first frequency | Periodic transmit of data up to a cycle time of 10 messages per second (msg/s) |
| P₂ | Periodically transmit at second frequency | Periodic transmit of data up to a cycle time of 3 messages per second (msg/s) |
| P₃ | Event-based transmit | Transmit of specified event-triggered data upon detecting respective event(s) |

FIG. 2 illustrates a system 200 including a plurality of vehicles 100 and an infrastructure element 210 including a computer 220, roads(s) 230 including road segment(s) 240, and a traffic light 280, in a geographical coverage area 215. Although only one traffic light 280 is shown, in fact one or more traffic lights 280 may be located within the coverage area 215. The computer 220 may communicate through a wired and/or wireless communication with the traffic lights 280. For example, the computer 220 may be programmed to communicate with the traffic light(s) 280 via the V2X communication network. The computer 220 may be programmed to receive a status of a traffic light 280, e.g., from a traffic light computer. A traffic light 280 status may include a light 280 location, e.g., GPS location coordinates, and information such as whether the light 280 is yellow, red, or green. Additionally or alternatively, the status of a light 280 may specify a status of the light 280 for each lane at an intersection of roads 230. Additionally or alternatively, information received from a traffic light 280 may specify to which road segment 240 (FIG. 2) the traffic light 280 applies, meaning a vehicle 100 in which road segment 240 should follow the traffic light 280 status for operation.

The computer 220 (or infrastructure computer 220) includes a processor and a memory such as are known. The memory includes one or more forms of computer-readable media, and stores instructions executable by the computer 220 for performing various operations, including as disclosed herein. The computer 220 may be configured for communicating through one or more infrastructure elements 210 with vehicles 100 via a V2X communication protocol, e.g., a DSRC network.

An infrastructure element 210 may include chips, antenna(s), transceiver(s), etc. The infrastructure element 210 may have a specified communication coverage area (or area 215). A coverage area 215, in the present context, is an area in which the infrastructure 210 can communicate with another computer, e.g., a vehicle 100 computer 110, a mobile device of a pedestrian, etc. Dimensions and/or shape of area 215 is typically based on a communication technique, communication frequency, communication power, etc., of the infrastructure element 210 as well as environmental factors, a topography (i.e., an arrangement of natural and artificial physical features of an area) of the area 215, etc. In one example, an area 215 is rectangular and centered at a location of the infrastructure element 210 with a side length of 1000 meters (m). In another example (not shown), an area 215 is circular and centered at the location of the infrastructure element 210 with a diameter of 2000 m. A location and dimensions of a coverage area 215 may be specified with respect to a coordinate system, e.g., a Cartesian coordinate system 270. In a Cartesian coordinate system 270, coordinates of points may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point from a specified horizontal plane, e.g., a sea level.

The infrastructure element 210 can be placed, typically permanently fixed, at a location in an area 215, e.g., mounted to a stationary object such as a pole, post, road overpass, sign, etc. As shown in FIG. 2, multiple vehicles 100 on the road(s) 230 may be within the coverage area 215 of the infrastructure element 210. Depending on dimensions of the coverage area 215 and dimensions of road segments 240, the coverage area 215 may include a plurality of segments 240. Road(s) 230 may be two-way (as shown in FIG. 2) or one-way. Roads 230 may have one or more lanes in each direction.

A road segment 240 is a portion of one or more of road 230 lanes. In one example, shown in FIG. 2, each segment 240 includes a portion of a lane with a length d, e.g., 50 meters, in a direction. Additionally or alternatively, road segments 240 may have different lengths d and/or width (i.e., number of adjacent lanes included in a segment 240). A segment 240 may have a rectangular or curved shape based on a curvature of the road 230.

A segment 240 may be identified by a segment 240 location, e.g., based on map data received from the infrastructure element 210 computer 220, location coordinates of a start point 250 of the segment 240, and the segment 240 length d. Additionally or alternatively, a segment 240 may be identified by location coordinates of a segment start point 250 and a segment end point 260. Thus, a perimeter of the segment 240 may be determined based on a start point 250, end point 260, and/or the length d with respect to a Cartesian coordinate system 270. The start point 250 is a point of the segment 240 determined based on a specified direction for vehicle 100 movement. A start point 250 of a segment 240 is therefore a point which is driven over by a vehicle 100 upon entering the respective segment 240. An end point 260 of a segment 240 is a point which is driven over by a vehicle 100 upon exiting the respective segment 240. The length d is a distance along the road 230 between the start point 250 and the end point 260 along the road 230. Thus, if the road 230 is curved, the length d of a road segment 240 is defined along the road 230 curvature between the respective start point 250 and the respective end point 260 of the segment 240. In one example, location coordinates of the start or end point 250, 260 may be location coordinates of a point located laterally in a middle of the lane. For ease of illustration only some start and end points 250, 260 are labeled in FIG. 2.

A computer 220 can be programmed to determine whether a vehicle communication channel busy ratio exceeds a threshold, e.g., 70%. The threshold typically indicates a channel busy ratio that is defines channel congestion, as discussed above. Upon determining that the channel busy ratio exceeds the threshold, the computer 220 can be programmed to classify a traffic condition for a road segment 240 within a coverage area 215 of an infrastructure element 210 based on a traffic density ρ (as defined below) and a status of a traffic light. The computer 220 may be further programmed to determine a broadcast policy P for the road segment based on a traffic classification Q, as discussed further below with respect to Table 2.

The density ρ may be determined by dividing the number $n_v$ of vehicles 100 located within a segment 240 by the length d of the segment 240, i.e., such that $ρ=n_v/d$. Additionally or alternatively, a segment 240 density ρ may be specified in vehicles per unit of time, e.g., second, e.g., a number of vehicles 100 passing a start point 250 to enter a segment 240 per second. The computer 220 may be programmed to receive data from a plurality of vehicles 100, and to identify one or more vehicles 100 from the plurality of vehicles 100 on a road segment 240 based on location data included in the received data. The computer 220 may be programmed to determine the traffic density ρ for the road segment 240 based on the identified one or more vehicles 100.

The computer 220 may be programmed to detect vehicle(s) 100, and to determine the segment 240 density ρ based on a number of detected vehicles 100 in a segment 240. The computer 220 may determine a number of vehicles 100 in the segment 240 based on whether determined location coordinates of the vehicles 100 are within location coordinates of the segment 240, i.e., are within a boundary defining the segment 240. The computer 220 may determine the segment 240 density ρ based on the identified number of vehicles 100 in the segment 240 and a length d of the segment 240.

In one example, the computer 220 may be programmed to determine an average speed v of a segment 240 based on Equation (1). Thus, the computer 220 may detect k vehicles 100 within a segment 240. The computer 220 may determine a speed $v_i$ of each of the vehicles 100 and determine the average speed v based on the vehicles 100 number k and speed $v_i$ of each of the vehicles 100. In the present context, a traffic condition of a road segment 240 includes a traffic density ρ of the respective road segment 240 and an average speed v of vehicles 100 within the respective road segment 240.

$$v = \frac{1}{k}\sum_{i=1}^{k} v_k$$

Table 2 shows an example set of rules to classify a traffic condition by determining a traffic classification Q for a road segment 240 based on a density ρ and an average speed v in the respective road segment 240. In the present context, a "traffic classification" of a segment 240 is a set of data including or at least determined based on an average speed v and a density ρ of vehicles 100. That is, a classification Q may include numeric values for average speed v and density ρ and/or a description selected from a set of possible classifications based on values for average speed v and density ρ, e.g., normal speed with no traffic light, traffic congestion with no traffic light, stopped at red light, normal speed at green traffic light, and traffic congestion at green light. In the latter instance, traffic classifications Q could be as shown in the examples of Table 2:

TABLE 2

| Traffic condition classification Q | Average Speed v (unit: kph) | Density ρ (vehicles per kilometer) | Traffic light status |
|---|---|---|---|
| normal speed with no traffic light | Greater than 8 | Less than 120 | No traffic light |
| traffic congestion with no traffic light | Less than 8 | Greater than 120 | No traffic light |
| traffic stop at traffic light | Less than 8 | Not applicable | Red light |
| normal speed at green traffic light | Greater than 8 | Not applicable | Green light |
| traffic congestion at green light | Less than 8 | Not applicable | Green light |
| slow moving traffic | Greate than 8 and less than 12 | Less than 120 | Not applicable |

In one example, the computer 220 may be programmed, in accordance with, e.g., Table 2, to classify the traffic condition of a segment 240 by determining a traffic condition classification Q, e.g., traffic congestion at green light, based on the average speed v and densify ρ of the respective segment 240.

The computer 220 may be further programmed to determine a broadcast policy P for a road segment 240 based on the traffic classification Q. The broadcast policy P may be one of example policies P, as shown in Table 1. Table 3 shows an example set of rules for selecting a broadcast policy P based on the identified traffic condition classification Q.

In one example, as shown in Table 3, the computer 220 may be programmed to select the periodic broadcast policy $P_1$ (Table 1) upon determining a traffic condition classification Q "normal-speed no traffic light" or "normal-speed green traffic light" (Table 2). In another example shown in Table 3, the computer 220 may be programmed to select the broadcast of only specified messages policy $P_3$ (Table 1) upon determining a traffic condition classification Q "traffic congestion with no traffic light", "stopped at red light", or "traffic congestion at green light" (Table 2).

TABLE 3

| Broadcast Policy P | Traffic condition classification Q |
|---|---|
| $P_1$ | "normal-speed no traffic light" or "normal-speed green traffic light" |
| $P_2$ | "slow moving traffic" |
| $P_3$ | traffic congestion with no traffic light" "stopped at red light" or "traffic congestion at green light" |

As discussed above, a coverage area 215 of an infrastructure element 210 may include a plurality of segments 240. The computer 220 can be programmed to broadcast information such as a segmentation table including one or more selected policies P for each segment 240 and location coordinates of segment(s) 240 within the coverage area 215. A segmentation table is a set of data including (i) a location of each segment 240 on road(s) 230 in a coverage area 215, and (ii) selected policy P for each segment 240. Table 4 shows an example segmentation table for m segments within the coverage area 215. Each row of Table 4 may include information corresponding to one segment 240 in the area 215. For example, the segmentation table may include location coordinates of segment 240. In one example, a location of a segment 240 may be specified by location coordinates (e.g., GPS coordinates) of a start point 250, an end point 260, and/or length d of the segment 240. Segments 240 may have same length d or different lengths $d_1, \ldots, d_m$. The segmentation table may include a selected policy $P_1, \ldots, P_m$ for each segment 240.

TABLE 4

| Segment identifier | Segment start point location | Segment length | Selected policy |
|---|---|---|---|
| $id_1$ | $x_1, y_1$ | $d_1$ | $P_1$ |
| ... | | | |
| $id_i$ | $x_1, y_1$ | $d_1$ | $P_1$ |
| ... | | | |
| $id_m$ | $x_m, y_m$ | $d_m$ | $P_m$ |

With respect to FIGS. 1-2, a vehicle 100 computer 110 may be programmed to receive the determined broadcast policy P, e.g., example segmentation table shown in Table 4, from the infrastructure element 210 computer 220 via the V2X communication network. The computer 110 may be programmed to determine a location of the vehicle 100 based on vehicle 100 sensor 130 data, and upon determining in which road segment 240 the vehicle 100 is located, identify a broadcast policy P for the vehicle 100 from the segmentation table. The vehicle 100 computer 110 then broadcasts vehicle 100 data based on the identified broadcast policy P.

The vehicle 100 computer 110 may be programmed to determine whether the vehicle 100 is within a segment 240 based on data received from the infrastructure element 210 computer 220 and vehicle 100 location data, e.g., location coordinates received from a vehicle 100 location sensor 130 such as a GPS (Global Positioning System). For example, upon receiving a broadcast policy $P_3$ including the permission to broadcast only specified messages, the vehicle 100 computer 110 may be programmed to limit outbound message to the specified messages, e.g., reporting a vehicle 100 malfunction. In yet another example, upon receiving a broadcast policy $P_1$ including periodically broadcast data, the vehicle 100 computer 110 may be programmed to broadcast data such as vehicle 100 speed based on vehicle 100 sensor 130 data and a specified cycle time for broadcasting data.

Figure 3:
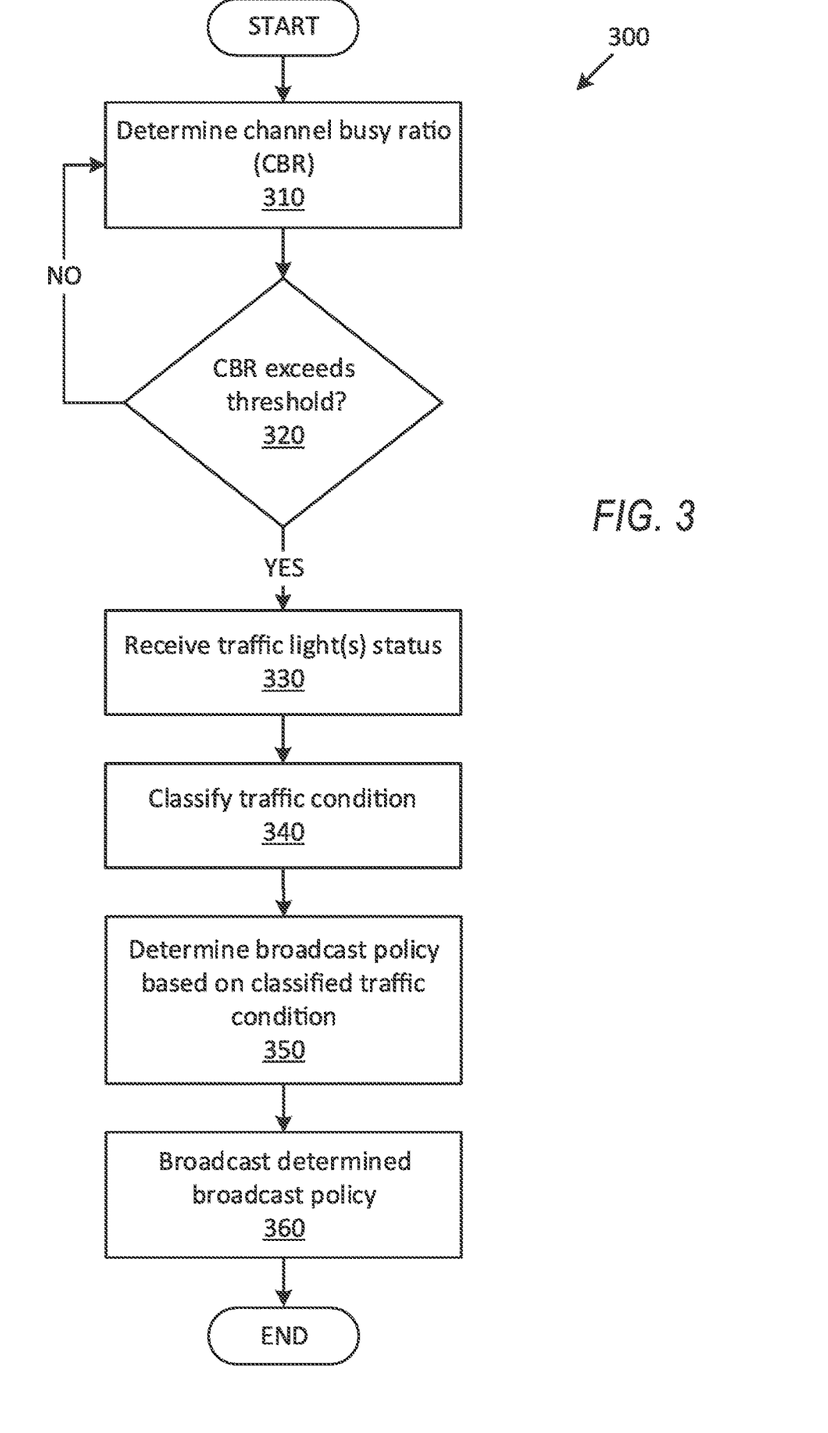
FIG. 3 is a flowchart of an exemplary process for determining a broadcast policy for a road segment.

FIG. 3 is a flowchart of an exemplary process 300 for determining a broadcast policy for a road segment. For example, an infrastructure element 210 computer 220 may be programmed to execute blocks of the process 300.

The process 300 begins in a block 310, in which the computer 220 determines a channel busy ratio (CBR) of a V2X communication network. A V2X communication network may have a plurality of channels. The computer 110 may be programmed to monitor each of the channels and determine a channel busy ratio for each of the channels.

Next, in a decision block 320, the computer 220 determines whether the channel busy ratio of a channel, e.g., a DSRC channel, exceeds a channel busy ratio threshold, e.g., 50%. If the computer 220 determines that the channel busy ratio exceeds the threshold, then the process 300 proceeds to a block 330; otherwise the process 300 returns to the block 310.

In the block 330, the computer 220 receives traffic light(s) 280 status data. The computer 220 may be programmed to receive, from a remote computer, data including a status of traffic light(s) 280 including a location, status of the lights 280, and data identifying one or more road segments 240 corresponding with the traffic light 280, as discussed above. Alternatively, the coverage area 215 of the infrastructure element 210 may lack any traffic light 280, e.g., an area 215 including only freeways and/or roads with roundabout, stop signs, etc.

Next, in a block 340, the computer 220 determines traffic classifications Q for respective road segment(s) 240 within the coverage area 215. The computer 220 may be programmed to determine a traffic classification Q for a segment 240 based on data received from the vehicle 100 computer(s) 110. The computer 220 may be programmed to determine a traffic density ρ and average speed v, as discussed above, and classify the traffic condition, e.g., based on an example set of rules shown in Table 2.

Next, in a block 350, the computer 220 determines a broadcast policy P for a road segment 240. The computer 220 may be programmed to implement a set of rules, e.g., as illustrated by Table 3, to determine the broadcast policy P for a road segment 240. A coverage area 215 of an infrastructure element 210 may include a plurality of road segments 240. Thus, the computer 220 may be programmed to determine a broadcast policy P for each of the road segments 240 based on the classified traffic condition of the respective road segments 240.

Next, in a block 360, the computer 220 broadcasts determined broadcast policies P. The computer 220 may be programmed to broadcast a location of a road segment 240 and a broadcast policy P of the respective road segment 240. As discussed above, the computer 220 may be programmed to determine broadcast policies P for a plurality of road segments 240. Thus, in one example, the computer 220 may be programmed to generate a segmentation table, e.g., as shown in Table 4, and broadcast the segmentation table via the V2X communication network. In one example, the computer 220 may be programmed to broadcast the segmentation table via a second channel, e.g., a channel 178 dedicated for broadcasting segmentation tables by the infrastructure element 210. Following the block 360, the process 300 ends, or alternatively returns to the block 310, although not shown in FIG. 3.

Figure 4:
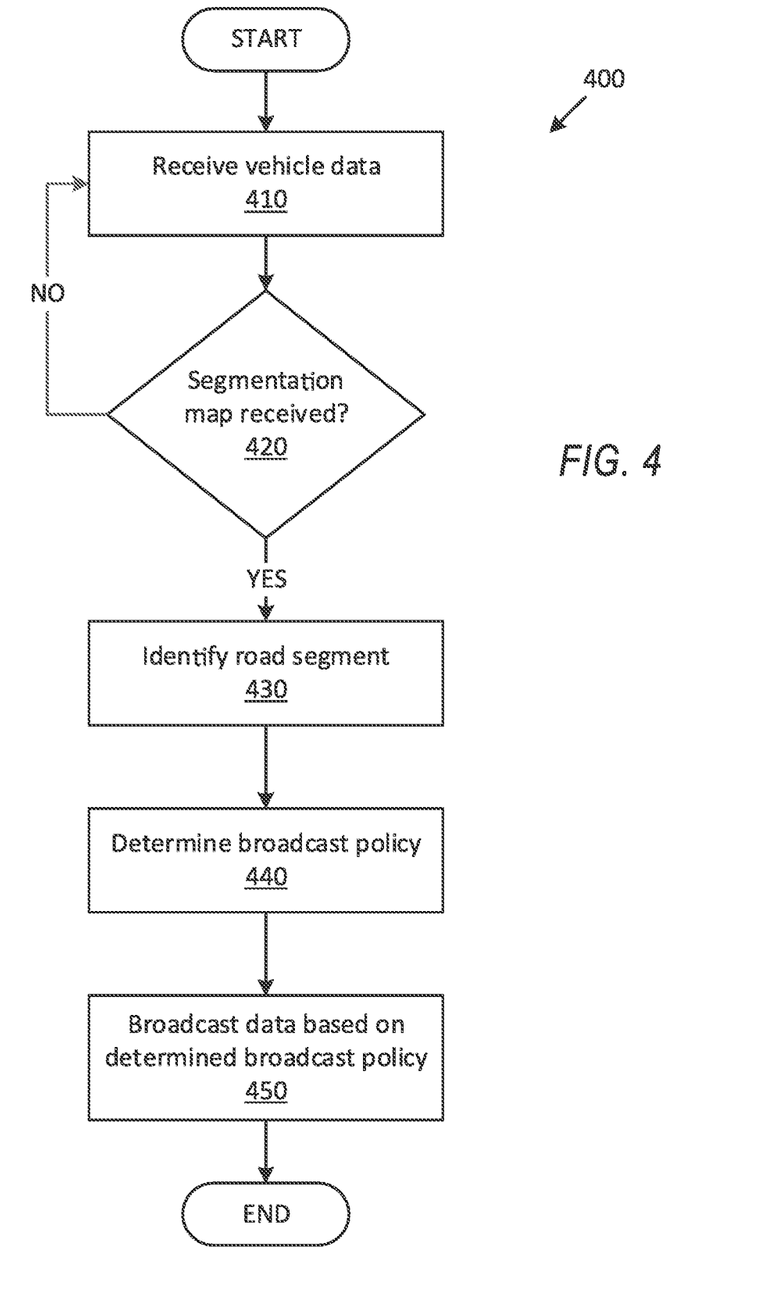
FIG. 4 is a flowchart of an exemplary process for transmitting messages based on a received broadcast policy.

FIG. 4 is a flowchart of an exemplary process 400 for transmitting messages based on a received broadcast policy. A vehicle 100 computer 110 may be programmed to execute blocks of the process 400.

The process 400 begins in a block 410, in which the computer 110. The computer 110 may be programmed to receive data from vehicle 100 sensor(s) 130 and/or vehicle 100 ECUs, controllers, actuators 120, etc. In one example, the computer 110 may receive vehicle 100 speed, location, yaw rate, acceleration, etc., from the vehicle 100 sensors 130. Additionally or alternatively, the computer 110 may be programmed to determine occurring of events such as a lateral drifting, slipping, a vehicle 100 malfunction, etc.

Next, in a decision block 420, the computer 110 determines whether a segmentation table is received from a remote computer, e.g., an infrastructure element 210 computer 220. Alternatively, the computer 110 may be programmed to determine whether a segmentation table has been received and saved in a computer 110 memory. If the computer 110 determines that the segmentation table is received, then the process 400 proceeds to a block 430; otherwise the process 400 returns to the block 410.

In the block 430, the process 400 identifies the road segment 240 in which the vehicle 100 is located. The vehicle 100 computer 110 may be programmed to determine the vehicle 100 location based on, e.g., location coordinates received from a vehicle 100 location sensor 130 such as a GPS sensor 130. The computer 110 may then determine a road segment 240 in which the vehicle 100 is located based on the segment 240 location coordinates included in the received segmentation table and the determined location of the vehicle 100.

Next, in a block 440, the computer 110 determines a broadcast policy P for the vehicle 100 based on the identified road segment 240 in which the vehicle 100 is located and the received segmentation table. A segmentation table, e.g., as illustrated by Table 4, includes location coordinates of the road segments 240 and respective broadcast policies P. Thus, the computer 110 may determine the broadcast policy P for the vehicle 100 based on the identified road segment 240 and the respective broadcast policy P specified by the segmentation table.

Next, in a block 450, the computer 110 broadcasts data based on the determined broadcast policy P. For example, the computer 110 may be programmed to broadcast event-triggered data upon determining, e.g., a broadcast policy $P_3$ (Table 3). Following the block 450, the process 400 ends, or alternatively returns to the block 410, although not shown in FIG. 4.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer and a memory, the memory storing instructions to:
   determine that a vehicle communication channel busy ratio exceeds a threshold;
   then, based upon determining that the channel busy ratio exceeds the threshold, classify a traffic condition for a road segment within a coverage area of an infrastructure element based on at least one of a traffic density and a status of a traffic light; and
   determine a broadcast policy for the road segment based on the channel busy ratio exceeding the threshold and the classified traffic condition, wherein the broadcast policy is selected from a set of policies that includes (1) a periodic broadcast of messages and (2) a broadcast limited to specified messages.

2. The system of claim 1, wherein the broadcast policy specifies a cycle time for the periodic broadcast.

3. The system of claim 1, wherein the specified messages report at least one of a deceleration exceeding a threshold, a vehicle malfunction, or an irregular vehicle motion including one of a slipping, a roll over, or a lateral drift.

4. The system of claim 1, wherein the instructions further include instructions to:
   receive data from a plurality of vehicles;
   identify one or more vehicles from the plurality of vehicles on the road segment based on location data included in the received data; and
   determine the traffic density for the road segment based on the identified one or more vehicles.

5. The system of claim 1, wherein the instructions further include instructions to:
- determine the status of the traffic light based on data received from a remote computer; and
- classify the traffic condition of the road segment based on whether a traffic in the road segment is stopped at a red light based on the determined status of the traffic light.

6. The system of claim 1, wherein the instructions further include instructions to:
- receive, in a vehicle, the determined broadcast policy;
- determine a location of the vehicle based on vehicle sensor data; and
- upon determining that the vehicle is within the road segment, broadcast vehicle data based on the determined broadcast policy.

7. The system of claim 1, wherein the instructions further include instructions to, upon receiving, in a vehicle, the broadcast policy including broadcast of only specified messages, limit vehicle outbound messages to the specified messages.

8. The system of claim 1, wherein the instructions further include instructions to, upon receiving, in a vehicle, the broadcast policy including to periodically broadcast data, broadcast, from the vehicle, data based on vehicle sensor data and a specified cycle time for broadcasting data.

9. The system of claim 1, wherein the classified traffic condition is one of a normal speed with no traffic light, traffic congestion with no traffic light, stopped at red light, normal speed at green traffic light, and traffic congestion at a green light.

10. The system of claim 9, wherein the instructions further include instructions to:
- select the periodic broadcast upon determining one of the normal speed with no traffic light and normal speed at a green light; and,
- select the broadcast of only specified messages upon determining one of the traffic congestion with no traffic light, stopped at red light, and a traffic congestion at green light.

11. A method, comprising:
- determining that a vehicle communication channel busy ratio exceeds a threshold;
- then, based upon determining that the channel busy ratio exceeds the threshold, classifying a traffic condition for a road segment within a coverage area of an infrastructure element based on at least one of a traffic density and a status of a traffic light; and
- determining a broadcast policy for the road segment based on the channel busy ratio exceeding the threshold and the classified traffic condition, wherein the broadcast policy is selected from a set of policies that includes (1) a periodic broadcast of messages and (2) a broadcast limited to specified messages.

12. The method of claim 11, wherein the broadcast policy specifies a cycle time for the periodic broadcast.

13. The method of claim 11, wherein the specified messages report at least one of a deceleration exceeding a threshold, a vehicle malfunction, or an irregular vehicle motion including one of a slipping, a roll over, or a lateral drift.

14. The method of claim 11, further comprising:
- receiving data from a plurality of vehicles;
- identifying one or more vehicles from the plurality of vehicles on the road segment based on location data included in the received data; and
- determining the traffic density for the road segment based on the identified one or more vehicles.

15. The method of claim 11, further comprising:
- determining the status of the traffic light based on data received from a remote computer; and
- classifying the traffic condition of the road segment based on whether traffic in the road segment is stopped at a red light based on the determined status of the traffic light.

16. The method of claim 11, further comprising:
- receiving, in a vehicle, the determined broadcast policy;
- determining a location of the vehicle based on vehicle sensor data; and
- upon determining that the vehicle is within the road segment, broadcasting vehicle data based on the determined broadcast policy.

17. The method of claim 11, further comprising, upon receiving, in a vehicle, the broadcast policy including broadcast of only specified messages, limiting vehicle outbound messages to the specified messages.

18. The method of claim 11, further comprising, upon receiving, in a vehicle, the broadcast policy including to periodically broadcast data, broadcasting, from the vehicle, data based on vehicle sensor data and a specified cycle time for broadcasting data.

19. The method of claim 11, wherein the classified traffic condition is one of a normal speed with no traffic light, traffic congestion with no traffic light, stopped at red light, normal speed at green traffic light, and traffic congestion at a green light.

20. The method of claim 19, further comprising:
- selecting the periodic broadcast upon determining one of the normal speed with no traffic light and normal speed at a green light; and,
- selecting the broadcast of only specified messages upon determining one of the traffic congestion with no traffic light, stopped at red light, and a traffic congestion at the green light.

* * * * *